US011154164B2

(12) United States Patent
Leung

(10) Patent No.: US 11,154,164 B2
(45) Date of Patent: Oct. 26, 2021

(54) GRINDING CUP FOR BLADE COFFEE GRINDER

(71) Applicant: SEB ASIA LIMITED, Tai Kok Tsui (HK)

(72) Inventor: Wai Chiu Leung, Kowloon (HK)

(73) Assignee: SEB ASIA LIMITED, Tai Kok Tsui (HK)

( * ) Notice: Subject to any disclaimer, the term of this patent is extended or adjusted under 35 U.S.C. 154(b) by 179 days.

(21) Appl. No.: 16/429,775

(22) Filed: Jun. 3, 2019

(65) Prior Publication Data
US 2020/0375400 A1    Dec. 3, 2020

(51) Int. Cl.
| | | |
|---|---|---|
| A47J 43/046 | (2006.01) | |
| A47J 42/46 | (2006.01) | |
| A47J 42/26 | (2006.01) | |

(52) U.S. Cl.
CPC ............. *A47J 43/046* (2013.01); *A47J 42/26* (2013.01)

(58) Field of Classification Search
None
See application file for complete search history.

(56) References Cited

U.S. PATENT DOCUMENTS

| | | | | |
|---|---|---|---|---|
| 3,493,022 A | * | 2/1970 | Mantelet | A47J 43/046 241/199.12 |
| 6,377,022 B1 | * | 4/2002 | Rhoads | A47J 42/26 320/114 |
| 2002/0153438 A1 | * | 10/2002 | Glucksman | A47J 42/42 241/36 |
| 2013/0048771 A1 | * | 2/2013 | Oh | A47J 43/046 241/275 |
| 2016/0345779 A1 | * | 12/2016 | Tu | A47J 43/0727 |
| 2017/0273509 A1 | * | 9/2017 | Wu | A47J 43/046 |

FOREIGN PATENT DOCUMENTS

| | | | | |
|---|---|---|---|---|
| FR | 2420369 A2 | * | 10/1979 | B02C 18/10 |
| WO | WO-2018060991 A1 | * | 4/2018 | A47J 42/26 |

OTHER PUBLICATIONS

English translate (FR2420369A2), retrieved date Jul. 19, 2021.*

* cited by examiner

*Primary Examiner* — Adam J Eiseman
*Assistant Examiner* — Mohammed S. Alawadi
(74) *Attorney, Agent, or Firm* — Pillsbury Winthrop Shaw Pittman LLP

(57) ABSTRACT

A grinding cup for a blade coffee grinder, includes a bottom wall; a sidewall extending upwardly from the bottom wall and defining an upper opening which is to receive coffee beans; a removable lid, the removable lid having a lower surface at least substantially covering the upper opening; wherein the lower surface includes a plurality of downwardly projecting ribs configured to promote movement of coffee grinds towards the interior of the grinding cup.

17 Claims, 5 Drawing Sheets

GRINDING CUP FOR BLADE COFFEE GRINDER

FIELD

The present invention relates to the field of coffee grinder, and in particular to a grinding cup for a blade coffee grinder.

BACKGROUND

Coffee grinders are machines for grinding coffee beans. There are two main types of coffee grinder: a blade coffee grinder and a burr coffee grinder. Both types of coffee grinder include a grinding cup which is to receive the coffee beans and is typically conical or cylindrical in shape. The grinding cup acts as a container for the coffee beans while they are being ground. A blade grinder comprises a rotating blade to grind the coffee beans. A burr grinder comprises a pair of burrs at least one of which is rotated in order to grind the coffee.

A blade coffee grinder may comprise a motor, a grinding cup for receiving the coffee grinds and a blade coupled to the motor. The blade projects into the grinding cup and is rotated by the motor in order to grind the coffee beans contained within the grinding cup. Due to centrifugal forces created by the rotation of the blade and air flows within the grinding cup, coffee beans and coffee grinds may be pushed towards the circumference of the grinding cup. Because of this coffee beans, partially ground beans and coffee grinds 10 may cluster around the circumference of the grinding cup 1 in the upper part above the blade as shown in FIG. 1.

The beans may thus move away from the interior of the cup and cluster at the upper part and/or around the circumference of the cup where they are out of reach of the blade. This may lead to incomplete and non-uniform grinding of the coffee beans, for example with large and inconsistent clumps of coffee grinds 10 as shown in FIG. 2. For instance in the example of FIG. 2, the clumps of coffee grinds 12, 14 and 16 have different sizes, with the clumps 12 and 14 being large and incompletely ground. However, in order to brew high quality coffee, the coffee grinds should be uniformly and consistently ground to a fine size.

SUMMARY

An aspect of the present disclosure is directed to a grinding cup for a coffee grinder with features to promote uniform grinding of the coffee. In one example the grinding cup has a lid with a plurality of ribs to promote movement of the coffee grinds towards the interior of the grinding cup, e.g. towards the center and away from the sidewalls and lid of the grinding cup.

Another aspect of the present disclosure proposes a grinding cup which does not have a conventional conical or cylindrical shape, but instead has an upper opening which is different in shape to the bottom wall of the cup. For instance, the grinding cup may have a circular upper opening and an oval bottom. In this way the shape of the grinding cup promotes tumbling and rotational motion of the coffee grinds so that the coffee grinds are less likely to cluster around the upper circumference of the grinding cup.

Another aspect of the present disclosure provides a blade coffee grinder comprising a motor, a grinding cup for receiving coffee beans according to either of the above aspects of the present disclosure and a blade projecting inside the grinding cup and coupled to the motor.

DETAILED DESCRIPTION

Figure 1:
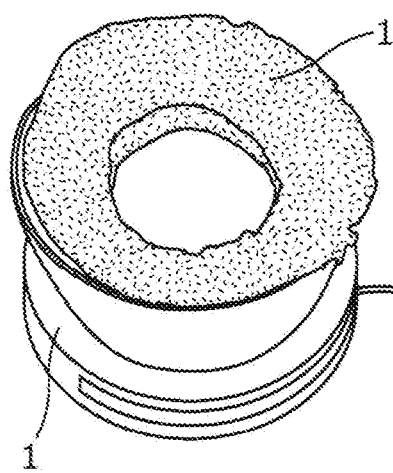
FIG. 1 shows an example of a prior art grinding cup.
Figure 2:
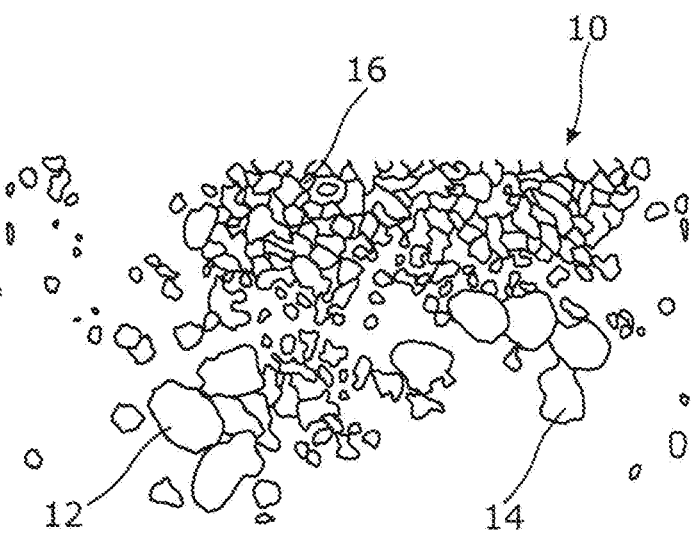
FIG. 2 shows an example of coffee beans incompletely ground by a blade coffee grinder with a grinding cup such as that shown in FIG. 1.
Figure 3:
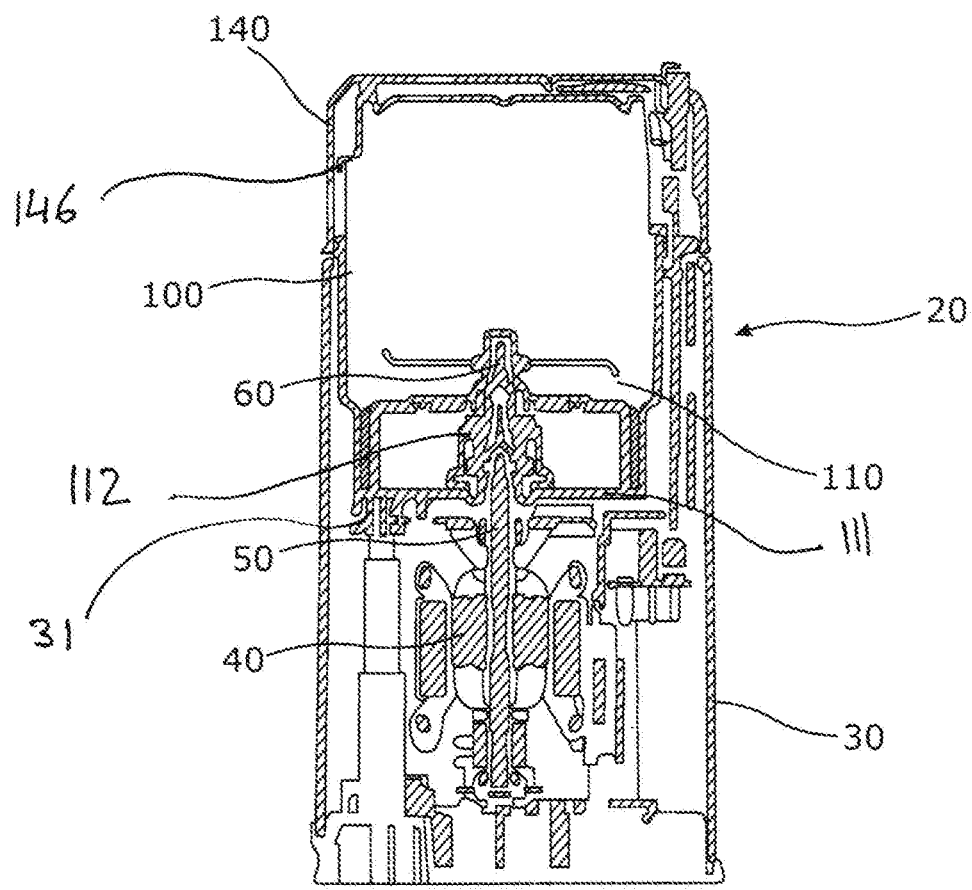
FIG. 3 is a schematic diagram showing an example blade coffee grinder according to an embodiment of the present disclosure.

FIG. 3 is a schematic diagram showing an example of a blade coffee grinder 20 according to the present disclosure. The blade coffee grinder 20 includes a main body 30 and a grinding cup 100 which is mounted at a top end of the main body 30. The blade coffee grinder 20 further comprises a motor 40, which may for example be provided in a base of the main body 30. The motor 40 drives movement of a blade 60 via an intermediary mechanism, such as shaft 50 positioned in the main body 30. The grinding cup 100 also includes a receiving mechanism 112 that forms the bottom part of the grinding cup 100 and that engages the shaft 50 when the grinding cup 100 is positioned on the main body 30. The receiving mechanism 112 is coupled to the blade 60 so that rotation of the shaft 50 rotates the blade 60 via the receiving mechanism 112.

The blade 60 extends inside the grinding cup 100 and may for example enter the grinding cup 100 through an aperture in a bottom wall 110 of the grinding cup. As shown, the grinding cup 100, including the blade 60, is removable from the main body 30 and has a mount 111 that is removably positioned on an upper part 31 of the main body 30. The mount 111 supports the receiving mechanism 112. The grinding cup 100 includes a removable lid 140 which covers an upper opening of the grinding cup. In one example the main body 30 of the coffee grinder may be substantially cylindrical in shape.

Figure 4:
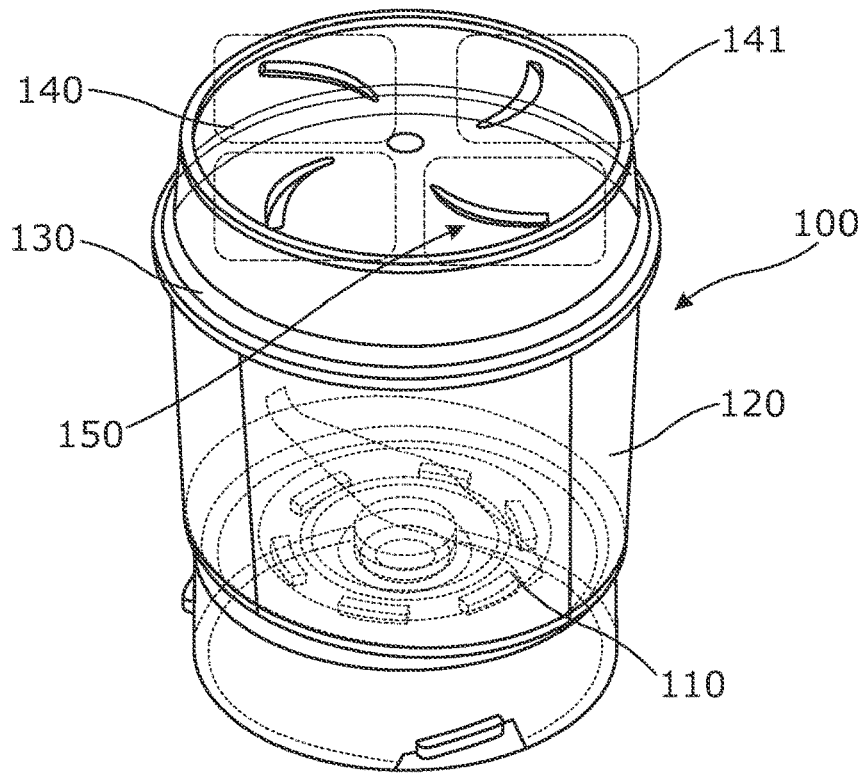
FIG. 4 shows an example of a grinding cup according to an embodiment of the present disclosure.

FIG. 4 shows an example structure of the grinding cup 100 for a blade coffee grinder according to an embodiment of the present disclosure. Such a grinding cup 100 may, for example, be used with the blade coffee grinder shown in FIG. 3. The grinding cup 100 comprises a bottom wall 110 and a sidewall 120 extending upwardly from the bottom wall. The sidewall defines an upper opening 130 which is to receive coffee beans. A removable lid 140 has a lower surface which at least substantially covers the upper opening 130, when the lid 140 is in place over the opening 130. For example, the removable lid 140 covers over 90% of the opening 130, and in an embodiment it completely covers the opening 130. The lower surface of the lid 140 includes a plurality of downwardly projecting ribs 150 which are configured to promote movement of coffee grinds towards the interior of the grinding cup. While the example of FIG.

4 shows a lid with four downwardly projecting ribs, in other examples there may be more or fewer ribs.

Figure 5:
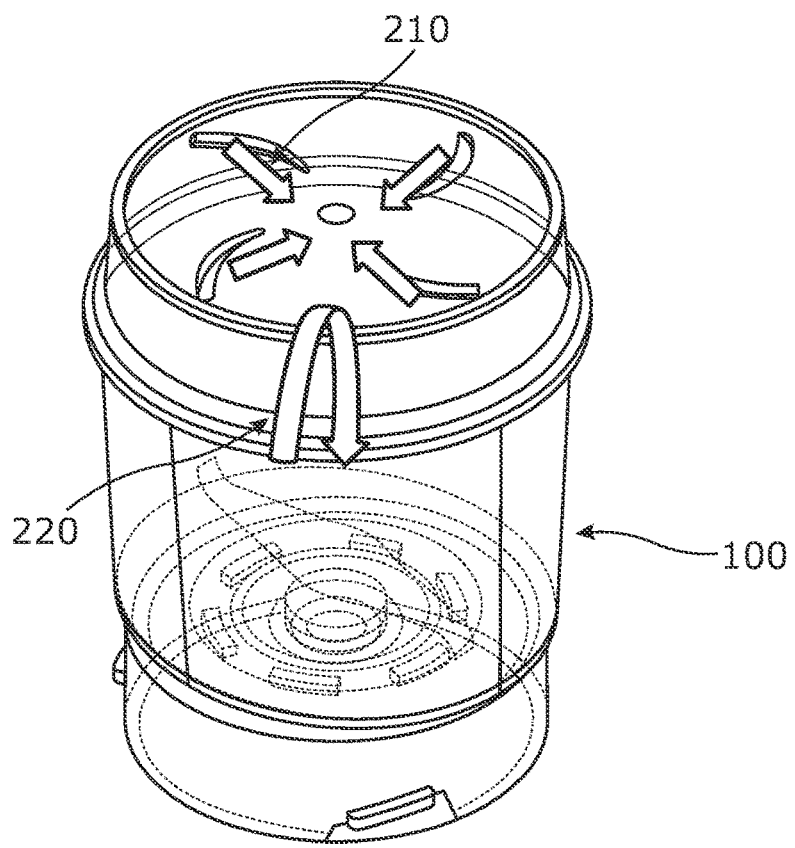
FIG. 5 shows examples of motion of coffee beans in the grinding cup of FIG. 4.

The downwardly projecting ribs 150 are shaped to promote movement of the coffee grinds towards the interior and away from the sidewall 120, as illustrated by the arrows 210 in FIG. 5. For example, as shown in FIG. 5, the downwardly projecting ribs 150 are curved to promote movement of the coffee grinds away from the sidewall 120 toward a center of the lid 140. The projecting ribs 150 may also promote a tumbling action away from the lower surface of the lid and back towards the interior and the bottom wall as shown by the arrow 220 in FIG. 5.

Figure 6:
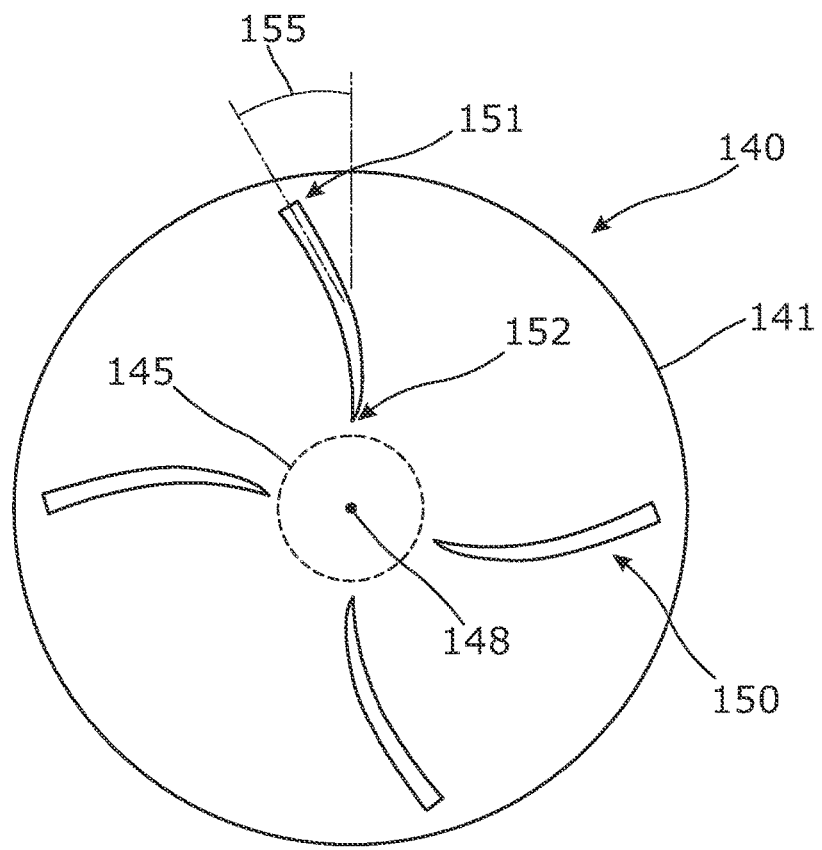
FIG. 6 is a plan view of the lower side of a lid of the grinding cup of FIG. 4.

FIG. 6 is a bottom plan view showing the lower surface 140 of the lid of FIG. 4. In the example of FIG. 6 the ribs 150 extend from a location proximate (i.e. near to) the circumference 141 of the lid 140 towards a center of the lid. Thus a first end 151 of each rib is proximate a circumference 141 of the lid and a second end 152 of each rib is proximate a center 148 of the lid. For example, in FIG. 6, the first end 151 is at a distance from the circumference 141 that is less than 20% of the length of the radius of the lid 140, for example less than 10% of the length of the radius of the lid 140, and in an embodiment less than 5% of the length of the radius of the lid 140. Furthermore, in FIG. 6, the second end 152 is at a distance from the center 148 that is less than 20% of the length of the radius of the lid 140, for example less than 10% of the length of the radius of the lid 140, and in an embodiment less than 5% of the length of the radius of the lid 140. In an embodiment, the distance separating two adjacent ribs 150 is the same for all the ribs. Thus, the ribs 150 are arranged at equidistance along the periphery of the lid. The ribs 150 may be arranged so that two opposite ribs are symmetrical relative to the axis passing through the center 148 of the lid 140.

In the example of FIG. 6 the lid has a rib free region 145 located radially inward from the second ends 152 of the ribs 150. The rib free region 145 may have an area less than 30% of a total area of the lid. For example, the rib free regions 145 may have an area between 10% and 30% of the total area of the lower surface of the lid. This arrangement helps to promote movement of coffee beans towards the center of the grinding cup where they may be ground the blade of the coffee grinder.

The ribs may be curved. For instance, the ribs may curve in a direction counter to a direction of rotation of a blade of the coffee grinder. In one example a direction of curvature of each rib 150 from the second end 152 of the rib to the first end 151 of the rib is opposite to the direction of rotation of the blade of the coffee grinder. For example, in FIG. 6 the direction of curvature from the second end 152 of the rib to the first end of the rib 151 is counter clockwise, while the direction of rotation of the blade (not shown in FIG. 6) is clockwise.

As shown in FIG. 6, the ribs 150 have a width at their first end 151 that is larger than that at their second end 152. In the embodiment of FIG. 6, the width of the ribs 150 progressively decreases from the first end 151 to the second end 152 to promote movement of coffee beans towards the center of the grinding cup.

The radius of curvature of the ribs may be greater than the radius of curvature of the circumference of the lid. In one example, an angle 155 between the first end and the second end of each rib is between 35 and 80 degrees. In the example of FIG. 6 the angle is approximately 45 degrees (e.g. 45 degrees +/−5 degrees).

In some examples, the lid 140 does not have any apertures. This helps to prevent coffee grinds from accidentally escaping the grinding cup due to upward motion imparted by the blade when the lid is in place. Rather coffee grinds tumble back towards the bottom wall of the grinding cup as shown by the arrows 220 in FIG. 5.

In other examples the lid 140 may have an aperture for receiving coffee grinds there through and the aperture may be coverable by a flap or otherwise to prevent escape of coffee beans during operation of the blade coffee grinder. The aperture may be provided in the rib free region 145 of the lid 140.

Figure 7:
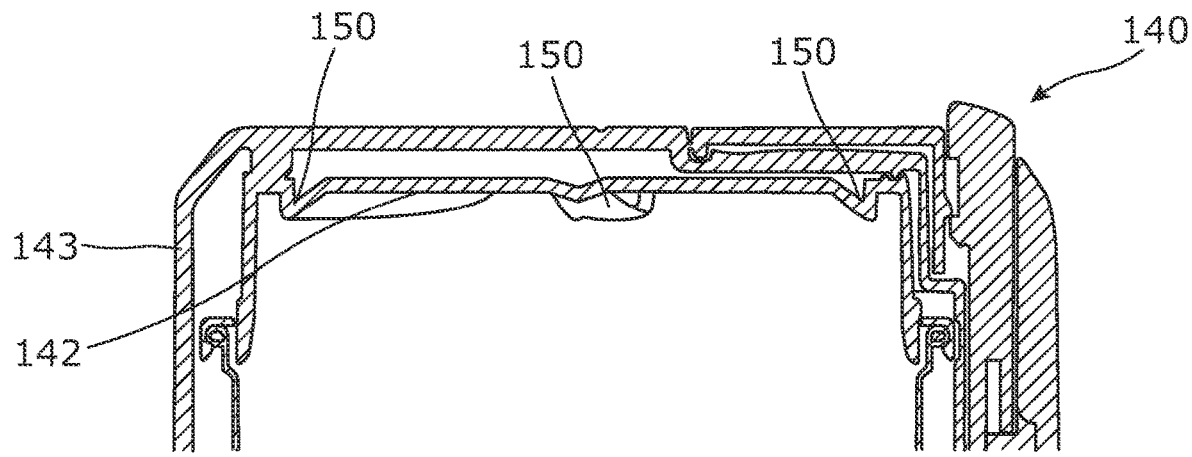
FIG. 7 is a cross-sectional view of the lid of the grinding cup of FIG. 3.

FIG. 7 is a cross-sectional view of the lid 140 of FIG. 3. The lid 140 has a lower surface 142 and a plurality of ribs 150 depending downwardly from the lower surface. As shown in FIG. 7, the ribs 150 are curved. In one example the height of the ribs, i.e. the depth to which they extend downwardly, may be between 3 mm and 5 mm. In an embodiment, the height of the ribs is greater at the first end 151 than at the second end 152 of the ribs and the height of the ribs decreases from the first end 151 to the second end 152. This arrangement helps to promote movement of coffee beans towards the center of the grinding cup. The lid 140 may further comprise side walls 143 which may extend downwardly from a circumference of the lower surface of the lid. In one example the sidewalls 143 may snap fit to the sidewall 120 of the grinding cup 100 via snap fit mechanism 146 (see FIG. 3). When in place the lid 140 substantially covers the upper opening 130 of the grinding cup 100. The lid 140 is removable and when removed coffee grinds may be poured into the grinding cup or the inside of the grinding cup may be cleaned.

Figure 8:
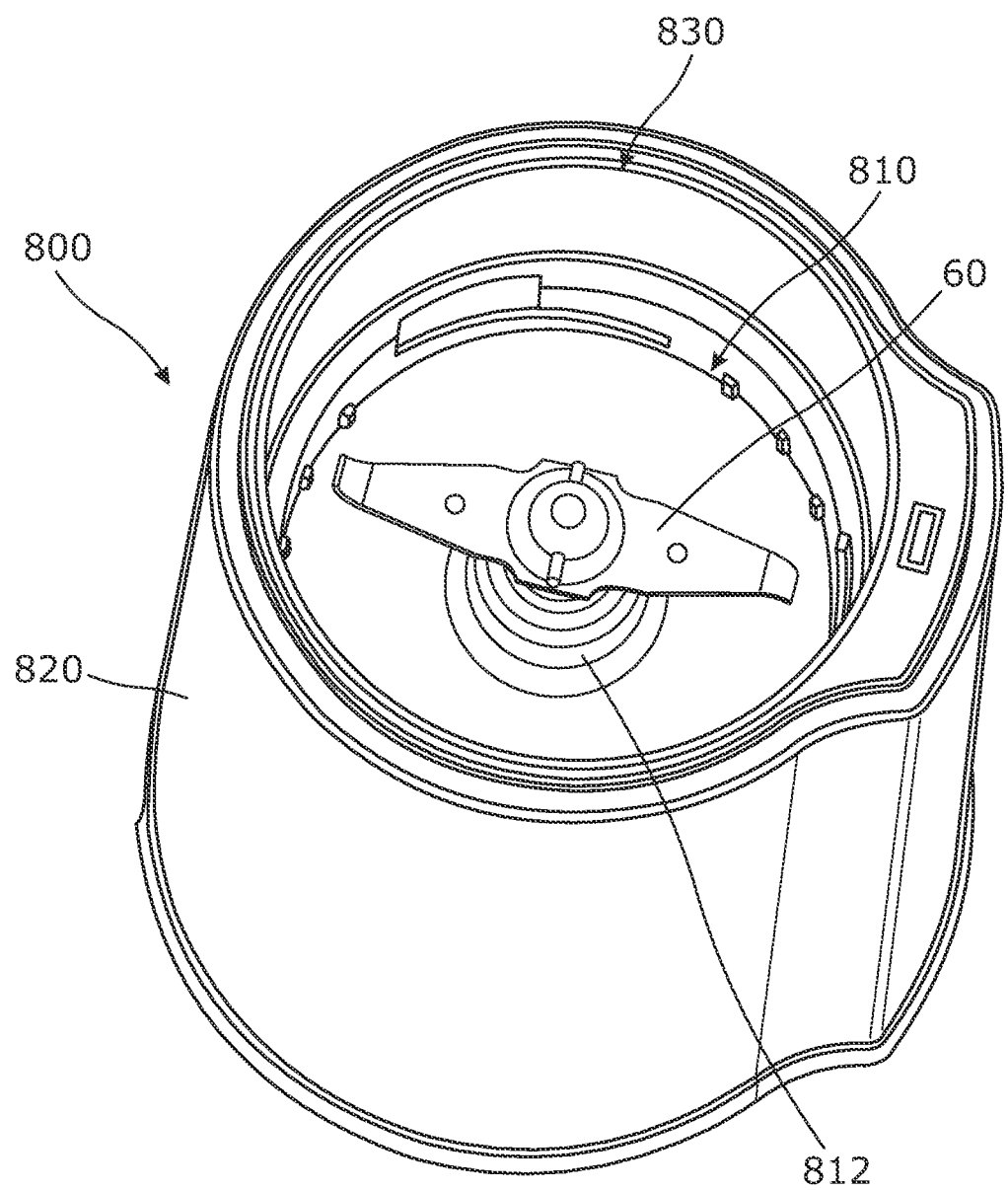
FIG. 8 is a perspective view from above of an example grinding cup according to an embodiment of the present disclosure.

FIG. 8 is a perspective view of an example grinding cup 800 according to the present disclosure. The grinding cup 800 may for example be used with a blade coffee grinder, such as that shown in FIG. 3. The grinding cup 800 has a bottom wall 810 and a sidewall 820 extending upwardly from the bottom wall. A blade 60 extends into the interior of the grinding cup through an aperture 812 in the bottom wall of the grinding cup. The sidewall 820 defines an upper opening 830. The upper opening 830 has a different shape to the bottom wall 810.

The differing shapes of the upper opening and bottom wall are configured to promote movement of coffee beans and coffee grinds towards the interior of the grinding cup and away from the sidewall 820 during operation of the coffee grinder. The sidewall 820 has an irregular shape due to the differing shape of the bottom wall 810 and the upper opening 830 and thus coffee beans tend not to get stuck or cluster around a circumference of the grinding cup. In one example the sidewall may be curved so as to avoid sharp angles or corners which may catch coffee beans.

Rather the smooth curves may promote movement of the coffee beans, but the irregular shape causes turbulence which prevents the coffee beans sticking to the circumference.

Figure 9A:
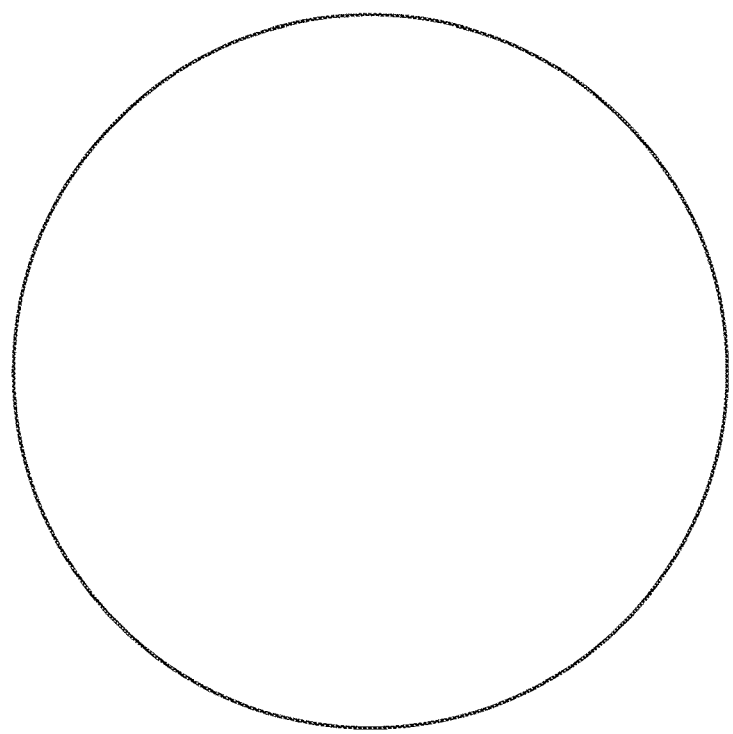
FIG. 9A is a plan view of the upper opening of the grinding cup of FIG. 8.
Figure 9B:
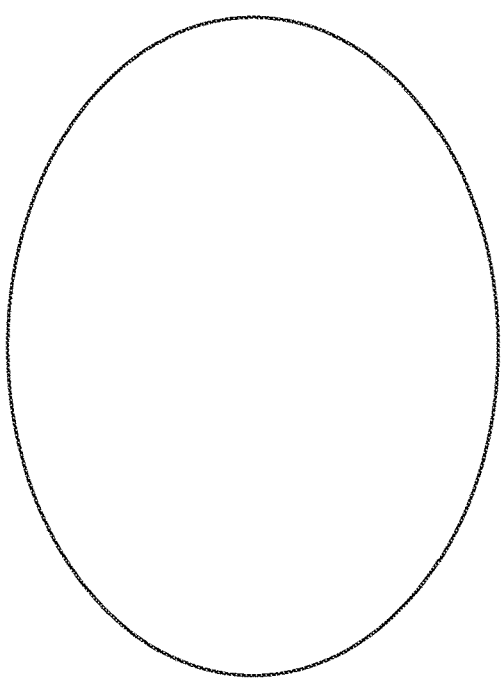
FIG. 9B is a plan view of the bottom wall of the grinding cup of FIG. 8.

In the example of FIG. 8, the upper opening 830 has a circular shape, as can be seen more clearly in FIG. 9A which is a plan view of the upper opening. The bottom wall meanwhile has an oval shape as shown in FIG. 9B, which is a plan view of the bottom wall. In other examples the bottom wall and the upper opening may have different shapes than those illustrated in FIGS. 8, 9A and 9B, as long as the upper opening is a different shape to a shape of the bottom wall. In an embodiment, the shape of the upper opening 830 progressively changes to the shape of the bottom wall 810 along the depth of the grinding cup 800. For example, in an embodiment, the circular shape is only present at the upper opening 830 and the shape of the upper opening 830 transforms into an ellipse with an increasing major axis along the depth of the grinding cup. In another embodiment, the shape of the upper opening 830 changes to the shape of the bottom wall 810 along the depth of the grinding cup by steps. In other words, the upper opening 830 and the bottom wall 810 retain their respective shape over part of the depth of the grinding cup 800, such as for example, up to 50% of the depth of the grinding cup. For example, the upper opening 830 may retain its shape along part of the depth of the grinding cup, e.g. less than 30% of the depth of the grinding cup, and in an embodiment less than 20% of the depth of the grinding cup, and in another embodiment less than 10% of the depth of the grinding cup. Likewise, the shape of the bottom wall 810 (i.e. cross-section shape) may remain the same along part of the depth of the grinding cup, e.g. less than 30% of the depth of the grinding cup, and in an embodiment less than 20% of the depth of the grinding cup, and in another embodiment less than 10% of the depth of the grinding cup. In particular, in an embodiment, one or more elliptical and/or circular intermediate shapes between the circular shape of the upper opening 830 and the elliptical shape of the bottom wall 810 can be present along the depth of the grinding cup.

In the context of this disclosure the shape of the bottom wall means the cross-sectional shape of the bottom wall in a first plane, e.g. as shown in FIG. 9A. The shape of the upper opening means the cross-sectional shape of the upper opening in a second plane, e.g. as shown in FIG. 9B. The first plane and the second plane may be parallel planes at different heights relative to the cup. The planes may be horizontal planes when the sidewalls extend vertically.

The cross sectional area of the upper opening, e.g. as shown in FIG. 9A may be less than the cross sectional area of the bottom wall, e.g. as shown in FIG. 9B. This helps to promote movement of coffee beans towards the interior of the grinding cup when the blade rotates.

The grinding cup 800 may have a lid with downwardly depending ribs as discussed above, for instance with reference to FIGS. 4-7, or may have a lid without downwardly depending ribs.

The present disclosure has been described above with reference to several illustrative examples. However, it is to be understood that a person skilled in the art may make variations or modifications to the above examples, while still remaining within the scope of the present disclosure.

The invention claimed is:

1. A grinding cup for a grinder blade coffee, the grinding cup comprising:
a bottom wall;
a sidewall extending upwardly from the bottom wall and defining an upper opening which is to receive coffee beans;
a removable lid, the removable lid having a lower surface covering the upper opening;
the bottom wall, the sidewall and the removable lid defining a grinding chamber of the blade coffee grinder to grind the coffee beans,
wherein said lower surface includes a plurality of downwardly projecting ribs configured to promote movement of coffee grinds towards the interior of the grinding cup,
wherein the grinding cup is adapted to be removably secured to the blade coffee grinder,
wherein the ribs extend from a location proximate a circumference of the lid towards a center of the lid, and
wherein the ribs have a profile that tapers towards the center of the lid.

2. The grinding cup of claim 1, wherein the lid does not include any apertures.

3. The grinding cup of claim 1, wherein a first end of each rib is proximate a circumference of the lid and a second end of each rib is proximate a center of the lid, there is a rib free region of the lid located radially inward from the second ends of the ribs, the rib free region having an area less than 30% of a total area of the lid.

4. The grinding cup of claim 1, wherein a height of the plurality of ribs is between 3 mm and 5 mm.

5. The grinding cup of claim 1, wherein the upper opening has a different shape to the bottom wall.

6. The grinding cup of claim 5, wherein the upper opening has a circular shape and the bottom wall has an oval shape.

7. The grinding cup of claim 5, wherein a cross sectional area of the upper opening is greater than a cross sectional area of the bottom wall.

8. The grinding cup of claim 6, wherein a cross sectional area of the upper opening is greater than a cross sectional area of the bottom wall.

9. A blade coffee grinder comprising:
a motor;
a grinding cup for receiving coffee beans to be ground;
a blade projecting inside the grinding cup and coupled to the motor;
wherein the grinding cup is a grinding cup according to claim 1.

10. The blade coffee grinder of claim 9, wherein the motor is configured to rotate the blade in a first direction and wherein the plurality of downwardly projecting ribs are curved ribs, a first end of each rib being proximate a circumference of the lid and a second end of each rib being proximate a center of the lid and a direction of curvature of each rib from the second end of the rib to the first end of the rib being counter to the first direction of rotation of the blade.

11. The grinding cup of claim 1, wherein the lower surface covers at least 90% of the upper opening.

12. A grinding cup for a blade coffee grinder, the grinding cup comprising:
a bottom wall;
a sidewall extending upwardly from the bottom wall and defining an upper opening which is to receive coffee beans;
a removable lid, the removable lid having a lower surface covering the upper opening;
wherein said lower surface includes a plurality of downwardly projecting ribs configured to promote movement of coffee grinds towards the interior of the grinding cup,
wherein the ribs extend from a location proximate a circumference of the lid towards a center of the lid,
wherein the ribs are curved,
wherein the grinding cup is adapted to be removably secured to the blade coffee grinder, and
wherein the ribs have a profile that tapers towards the center of the lid.

13. The grinding cup of claim 12, wherein each rib has a first end proximate a circumference of the lid and a second end proximate a center of the lid and a direction of curvature of each rib from the second end of the rib to the first end of the rib is opposite to a direction of rotation of the blade of the coffee grinder.

14. The grinding cup of claim 12, wherein each rib has a first end proximate a circumference of the lid and a second end proximate a center of the lid and wherein an angle between the first end and the second end of the rib is between 35 and 80 degrees.

15. A grinding cup for a blade coffee grinder, the grinding cup comprising:
a bottom wall;
a sidewall extending upwardly from the bottom wall and defining an upper opening which is to receive coffee beans;
a removable lid for covering the upper opening, the removable lid having a lower surface which faces the bottom wall when the removable lid covers the upper opening,
wherein the bottom wall, the sidewall and the removable lid define a grinding chamber of the blade coffee grinder to grind the coffee beans,
wherein the upper opening has a circular shape and the bottom wall has an oval shape,
wherein said lower surface includes a plurality of downwardly projecting ribs configured to promote movement of coffee grinds towards the interior of the grinding cup, and
wherein the ribs have a profile that tapers towards a center of the lid.

16. The grinding cup of claim 15, wherein a cross sectional area of the upper opening is greater than a cross sectional area of the bottom wall.

17. A blade coffee grinder comprising:
a motor;
a grinding cup for receiving coffee beans to be ground;
a blade projecting inside the grinding cup and coupled to the motor;
wherein the grinding cup is a grinding cup according to claim 15.

* * * * *